(12) United States Patent
Veerapathiran et al.

(10) Patent No.: US 11,193,522 B2
(45) Date of Patent: Dec. 7, 2021

(54) SHEAR BOLT

(71) Applicant: 3M INNOVATIVE PROPERTIES COMPANY, St. Paul, MN (US)

(72) Inventors: Natarajan Veerapathiran, Bengaluru (IN); Sanjay Jha, Bengaluru (IN); Rajapanth Srinivasa Murthy Madhava Murthy, Bengaluru (IN); Permeet Singh, Tamilnadu (IN); Manoj Prabhaker Patil, Bengaluru (IN)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 216 days.

(21) Appl. No.: 16/349,020

(22) PCT Filed: Nov. 14, 2017

(86) PCT No.: PCT/US2017/061515
§ 371 (c)(1),
(2) Date: May 10, 2019

(87) PCT Pub. No.: WO2018/102118
PCT Pub. Date: Jun. 7, 2018

(65) Prior Publication Data
US 2019/0285107 A1      Sep. 19, 2019

Related U.S. Application Data

(60) Provisional application No. 62/427,968, filed on Nov. 30, 2016.

(51) Int. Cl.
*F16B 31/00*       (2006.01)
*F16B 35/00*       (2006.01)
(Continued)

(52) U.S. Cl.
CPC .......... *F16B 31/021* (2013.01); *F16B 35/005* (2013.01); *H01R 4/36* (2013.01)

(58) Field of Classification Search
CPC .... F16B 31/021; F16B 35/005; F16B 35/041; H01R 4/36
(Continued)

(56) References Cited

U.S. PATENT DOCUMENTS 1,784,377 A  * 12/1930 Moore .................. F16B 35/005
                                                             411/393
3,865,007 A      2/1975  Stanback
(Continued)

FOREIGN PATENT DOCUMENTS

AU       2011201558       10/2011
AU       2012200645       8/2012
(Continued)

OTHER PUBLICATIONS

International Search Report for PCT International Application No. PCT/US2017/061515, dated Feb. 7, 2018, 6 pages.

*Primary Examiner* — Flemming Saether
(74) *Attorney, Agent, or Firm* — Clifton F. Richardson

(57) ABSTRACT

A shear bolt including a head portion and a shaft portion extending along an axis from the head portion is described. The shaft portion has a threaded outer surface and a stepped bore where the stepped bore has a plurality of regions along the axis and a plurality of steps. Each step in the plurality of steps separates adjacent regions in the plurality of regions and an inner diameter of the stepped bore is constant in each region in the plurality of regions and changes discontinuously at each step in the plurality of steps. The inner diameter increases from a first region in the plurality of regions closest to the head portion to a second region in the plurality of regions farthest from the head portion.

8 Claims, 2 Drawing Sheets

(51) Int. Cl.
*F16B 31/02* (2006.01)
*H01R 4/36* (2006.01)

(58) Field of Classification Search
USPC .................................. 411/393, 2, 3, 395, 424
See application file for complete search history.

(56) References Cited

U.S. PATENT DOCUMENTS

| | | | |
|---|---|---|---|
| 3,963,322 A | 6/1976 | Gryctko | |
| 4,199,216 A | 4/1980 | Gryctko | |
| 5,041,004 A | 8/1991 | Waldorf | |
| 5,584,625 A | 12/1996 | Petri | |
| 5,678,962 A | 10/1997 | Hyatt | |
| 6,042,430 A | 3/2000 | Hollick | |
| 6,056,753 A * | 5/2000 | Jackson | A61B 17/7032 411/5 |
| 6,074,121 A | 6/2000 | Medeiros | |
| 6,176,659 B1 | 1/2001 | Hardt | |
| 6,198,049 B1 | 3/2001 | Korinek | |
| 6,209,424 B1 | 4/2001 | Croton | |
| 6,321,624 B1 | 11/2001 | Croton | |
| 7,214,108 B2 | 5/2007 | Barnett | |
| 7,249,982 B1 | 7/2007 | Craig | |
| 7,641,674 B2 * | 1/2010 | Young | A61B 17/7032 606/270 |
| 7,717,658 B2 | 5/2010 | Peltier | |
| 8,668,419 B2 * | 3/2014 | Hardt | F16B 31/021 411/5 |
| 9,835,192 B2 * | 12/2017 | Castonguay | H01R 4/36 |
| 2004/0167525 A1 * | 8/2004 | Jackson | F16B 35/047 606/278 |
| 2007/0253792 A1 | 11/2007 | Zahnen | |
| 2009/0196708 A1 | 8/2009 | Stauch | |

FOREIGN PATENT DOCUMENTS

| | | |
|---|---|---|
| DE | 4113242 | 10/1992 |
| DE | 4435003 | 4/1996 |
| DE | 19960198 | 6/2001 |
| DE | 102008041263 | 2/2010 |
| DE | 102015102223 | 8/2016 |
| EP | 0470388 | 2/1992 |
| EP | 0634811 | 1/1995 |
| EP | 0692643 | 1/1996 |
| EP | 1376764 | 1/2004 |
| EP | 1460278 | 9/2004 |
| EP | 1626187 | 2/2006 |
| EP | 1833117 | 9/2007 |
| EP | 2281291 | 9/2007 |
| EP | 2283219 | 10/2007 |
| EP | 1911981 | 4/2008 |
| EP | 1933043 | 6/2008 |
| EP | 1953397 | 8/2008 |
| EP | 2128932 | 12/2009 |
| EP | 2159881 | 3/2010 |
| EP | 2322816 | 5/2011 |
| EP | 1074969 | 7/2011 |
| EP | 2381534 | 10/2011 |
| EP | 2381535 | 10/2011 |
| EP | 2498338 | 9/2012 |
| EP | 2498339 | 9/2012 |
| EP | 2657548 | 10/2013 |
| FR | 2491564 | 4/1982 |
| FR | 2503807 | 10/1982 |
| FR | 2593572 | 7/1987 |
| FR | 2598855 | 11/1987 |
| FR | 2607881 | 6/1988 |
| FR | 2653095 | 4/1991 |
| FR | 2673473 | 9/1992 |
| FR | 2752889 | 3/1998 |
| FR | 2758211 | 7/1998 |
| FR | 2758212 | 7/1998 |
| FR | 2760495 | 9/1998 |
| FR | 2777489 | 10/1999 |
| FR | 2791404 | 9/2000 |
| FR | 2841946 | 1/2004 |
| GB | 2272586 | 5/1994 |
| GB | 2406626 | 4/2005 |
| GB | 2421642 | 6/2006 |
| JP | S60-59446 | 12/1985 |
| JP | S62-52529 | 11/1987 |
| JP | H04-331810 | 11/1992 |
| WO | 1996-021957 | 7/1996 |
| WO | 2002-018803 | 3/2002 |
| WO | 2004-079866 | 9/2004 |
| WO | 2007-121774 | 11/2007 |
| WO | 2008-047119 | 4/2008 |
| WO | 2014-000881 | 1/2014 |

* cited by examiner

SHEAR BOLT

BACKGROUND

Shear bolts can be used to attach two objects together and are adapted to shear when subjected to a torque above a threshold.

SUMMARY

In some aspects of the present description, a shear bolt including a head portion and a shaft portion extending along an axis from the head portion is provided. The shaft portion has a threaded outer surface and a stepped bore. The stepped bore has a plurality of regions along the axis and a plurality of steps. Each step in the plurality of steps separates adjacent regions in the plurality of regions and an inner diameter of the stepped bore is constant in each region in the plurality of regions and changes discontinuously at each step in the plurality of steps. The inner diameter increases from a first region in the plurality of regions closest to the head portion to a second region in the plurality of regions farthest from the head portion.

The shear bolts of the present description are useful in a wide variety of applications where it is desired to attach two objects together. For example, the shear bolts can be used automotive power transmission applications, aerial power distribution products, aerospace applications, heavy equipment applications, and electrical connector applications. In electrical connector applications, the shear bolts may be used to attach a cable to a connector, for example.

In some aspects of the present description, a cable assembly including a connector and a cable inserted into the connector is provided. A shaft extends through a portion of the connector to the cable. The shaft has a threaded outer surface, a stepped bore extending along an axis of the shaft, and a contact portion inserted into a first end of the stepped bore and in direct contact with the cable. The stepped bore has a plurality of regions along the axis with an inner diameter of the stepped bore being constant in each region and changing discontinuously between adjacent regions. The inner diameter of the stepped bore increases from a first region in the plurality of regions closest to the outer surface of the connector to a second region in the plurality of regions farthest from outer surface of the connector.

DETAILED DESCRIPTION

In the following description, reference is made to the accompanying drawings that forms a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

The shear bolts may be designed to shear at a predetermined torque or stress. Such shear bolts may be used to attach two objects together with a predetermined tightening torque or may be adapted to shear at a predetermined stress or torque as a mechanical safeguard and/or for safety reasons. The shear bolts of the present description include a stepped bore which can have a variety of benefits. For example, a stepped bore can provide a plurality of shearing locations with each shearing location corresponding to a step in the stepped bore. This can be desired in some cases since the plurality of shearing locations can give flexibility to accommodate a variety of applications. The shearing torque at the steps can be controlled by controlling the stepped bore wall thickness and/or the height of the steps.

Figure 1:
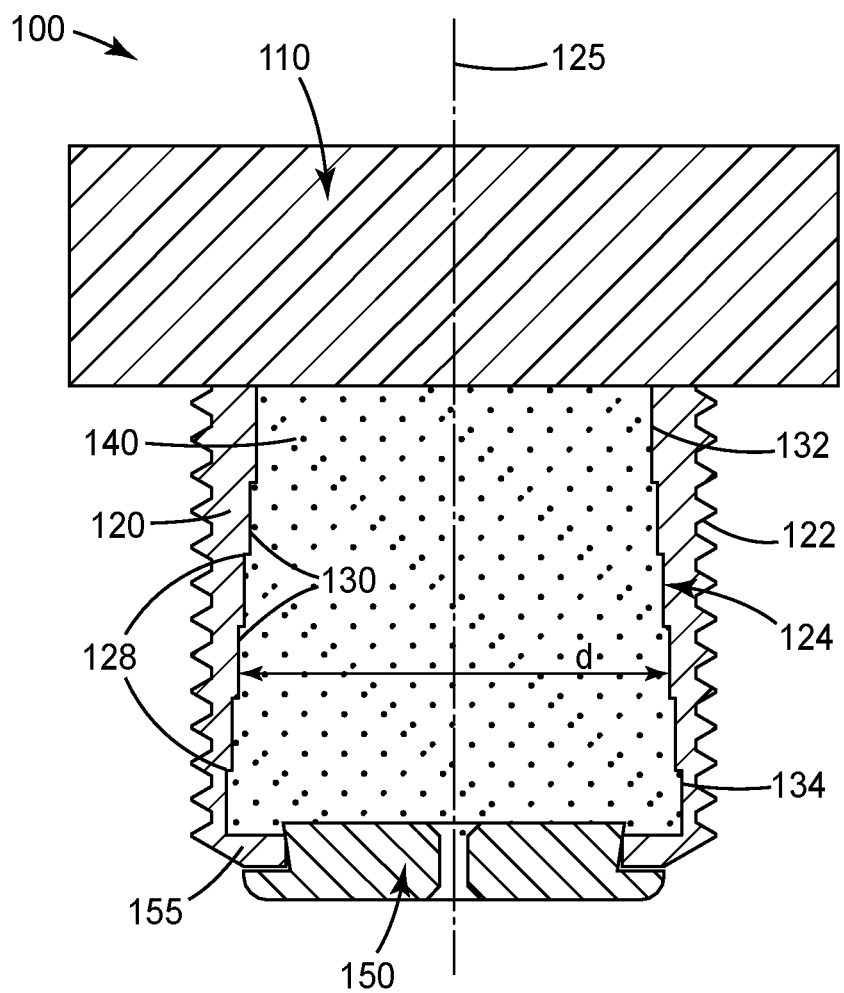
FIG. 1 is a cross-sectional view of a shear bolt.

FIG. 1 is a cross-sectional view of shear bolt 100 including a head portion 110 and a shaft portion 120 extending along an axis 125 from the head portion 110. The shaft portion 120 has a threaded outer surface 122 and a stepped bore 124 which has a plurality of regions 130 along the axis 125 and a plurality of steps 128. Each step in the plurality of steps 128 separate adjacent regions in the plurality of regions 130. An inner diameter d of the stepped bore is constant in each region in the plurality of regions 130 and changes discontinuously at each step in the plurality of steps 128. The inner diameter d increases from a first region 132 in the plurality of regions 130 closest to the head portion 110 to a second region 134 in the plurality of regions 130 farthest from the head portion 110. In the illustrated embodiment, a contact portion 150 is inserted into an end 155 of the stepped bore opposite the head portion 110. In other embodiments, the contact portion 150 is omitted. In some embodiments, the contact portion 150 is press fit into the end 155 of the stepped bore 124. The height of the steps 128 (difference in inner diameter between adjacent regions) can be selected to be any suitable value which may depend on the desired application. In some embodiments, the height of the steps 128 is in a range of 1 micrometer to 1 millimeter, for example. The number of regions in the plurality of regions 130 can be selected to be any suitable value which may depend on the desired application. In some embodiments, at least 3, or at least 5 regions are included. In some embodiments, no more than 100, or no more than 50, or no more than 30 regions are included.

The stepped bore 124 can be made by machining (e.g., drilling) the bolt along the axis 125. The regions in the plurality of regions 130 can be machined sequentially with the regions nearest the head portion 110 formed before regions further from the head portion 110 are fully formed. Suitable machining processes include Computer Numerical Control (CNC) precision machining. Drilling a bore into a bolt is generally described in EP1460278 (Frank et al.), for example. Other useful methods for forming a bore are described in U.S. Pat. No. 5,678,962 (Hyatt et al.), for example. In some embodiments, the shear bolts are made from a metal or an alloy such as, for example, an aluminum alloy (e.g., 6082-T6 aluminum alloy). The contact portion 150 and optional caps described elsewhere herein may also be made from a metal or metal alloy.

In some embodiments, the head portion 110 does not have any holes therethrough. The stepped bore 124 may optionally be filled, unfilled, or partially filled. As used herein, a stepped bore may be described as filled if at least 90 percent of the volume of the stepped bore is filled with a material other than air and may otherwise be described as not filled. In the illustrated embodiment, a material 140, which may be air, is disposed in the stepped bore 124. In some embodiments, the stepped bore 124 is filled. For example, the material 140 may be a resin or polymeric material filling the stepped bore 124. The type of material 140 chosen may depend on the intended application. In electrical applications, the material 140 may be electrically conductive. In some embodiments, the stepped bore 124 is filled with a resin or polymeric material and/or filled with an electrically conductive material. In some embodiments, the resin or polymeric material filling the stepped bore is electrically conductive. For example, the resin or polymeric material may include electrically conductive filler at a concentration above a percolation threshold so that the material 140 is conductive. Suitable resins or polymeric materials include epoxy resins, for example. Suitable electrically conductive filler includes metallic particles, for example. In some embodiments, the stepped bore 124 is not filled and the material 140 is air.

The shear bolts of the present description can be used in a wide variety of applications including, but not limited to, automotive power transmission applications, aerial power distribution products, aerospace applications, heavy equipment applications, and electrical connector applications. One illustrative application of the shear bolts is in attaching a cable to a connector.

Figure 2A:
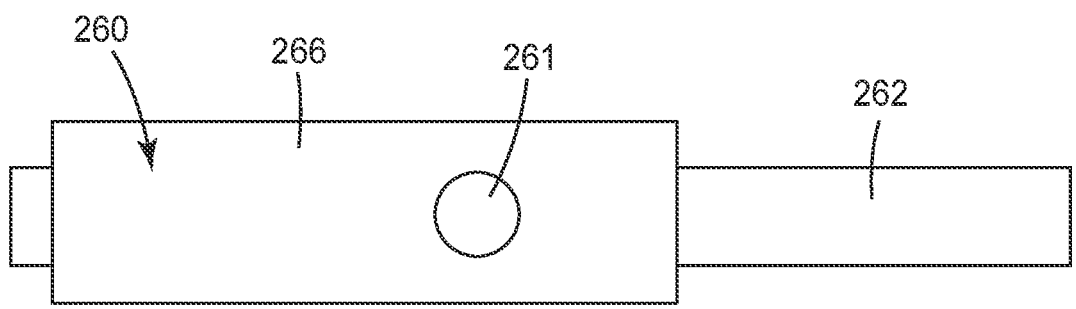
FIG. 2A is a schematic top view of a cable inserted into a connector.
Figure 2B:
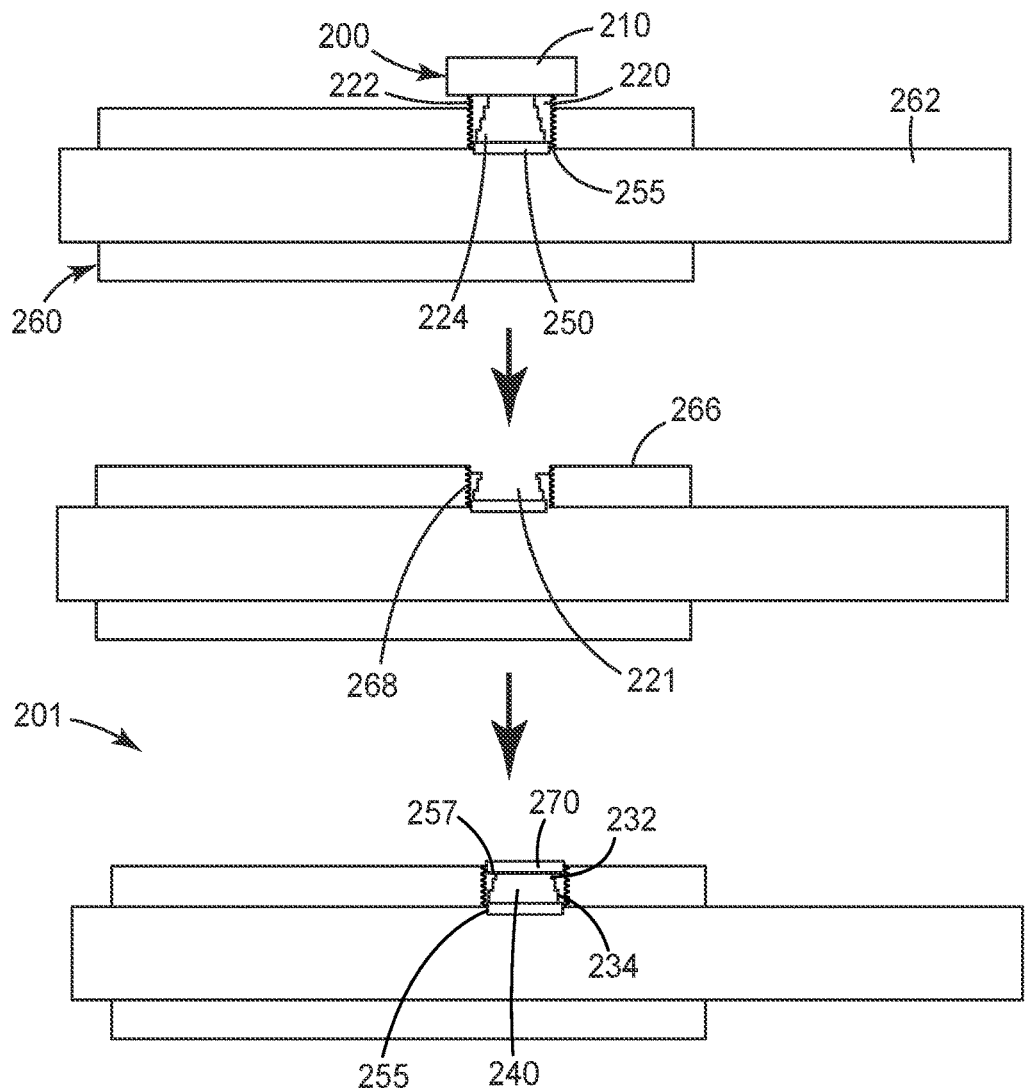
FIG. 2B is a schematic cross-sectional view illustrating utilizing a shear bolt to fasten a cable to a connector.

FIGS. 2A-2B illustrate the use of shear bolts of the present description in a connector application. FIG. 2A is a schematic top view of a cable assembly prior to insertion of a shear bolt into threaded hole 261. The cable assembly includes a connector 260 having an outer surface 266 and a cable 262 inserted into the connector 260. FIG. 2B is a schematic cross-sectional view of a process of inserting and tightening a shear bolt 200 of the present description into the threaded hole 261. Shear bolt 200 may correspond to shear bolt 100, for example. The shear bolt 200 includes a head portion 210 and a shaft portion 220 extending from the head portion 210. The shaft portion 220 includes a stepped bore 224 and a threaded outer surface 222. A contact portion 250 is inserted into a first end 255 of the stepped bore 224 opposite the head portion 210. Upon tightening the shear bolt 200, the contact portion 250 directly contacts the cable 262 and the shaft portion 220 breaks off at a shear concentration location provided by a step in the stepped bore 224 leaving a remaining shaft 221 extending through a portion 268 of the connector 260. After the head portion 210 is sheared off, an optional cap 270 is provided to cover a second end 257 of the shaft 221 opposite the first end 255. The resulting cable assembly 201 includes a connector 260 with a cable 262 inserted into the connector 260 and a shaft 221 extending through a portion 268 of the connector 260 where the shaft 221 has a threaded outer surface 222, a stepped bore extending along an axis (corresponding to axis 125) of the shaft 221, and a contact portion 250 inserted into a first end 255 of the stepped bore 224 and in direct contact with the cable 262. As described further elsewhere herein, the stepped bore 224 has a plurality of regions along the axis, an inner diameter of the stepped bore being constant in each region and changing discontinuously between adjacent regions. The inner diameter of the stepped bore 224 increases from a first region 232 in the plurality of regions closest to the outer surface 266 of the connector to a second region 234 in the plurality of regions farthest from outer surface 266 of the connector.

In some embodiments, the stepped bore 224 is filled and in some embodiments the stepped bore 224 is not filled. In some embodiments, the stepped bore 224 is filled with a material 240 than may be a resin or polymeric material and in some embodiments, the stepped bore 224 is filled with a material 240 that may be electrically conductive. In some embodiments, the stepped bore 224 is filled prior to the insertion of the shear bolt 200 into threaded hole 261 so that there is no need to fill the stepped bore 224 after the head portion 210 has been sheared off. Suitable illustrative materials for filling a stepped bore are described further elsewhere herein.

Figure 3:
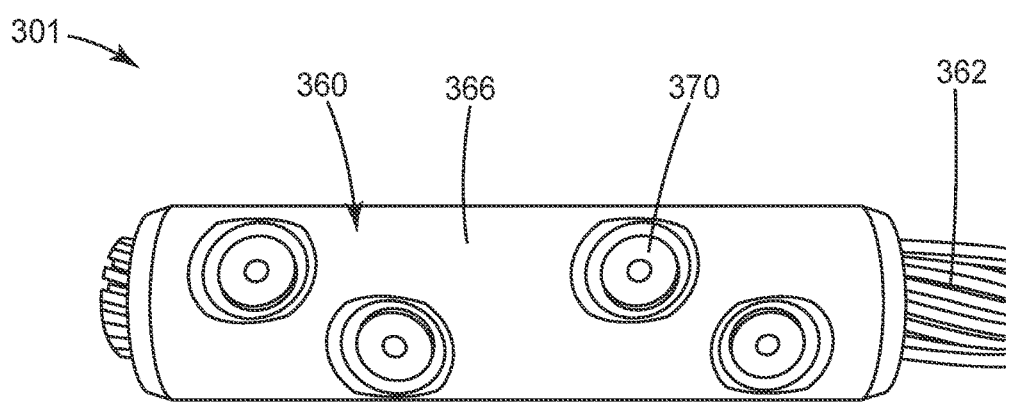
FIG. 3 is a top view of a cable assembly.

Although a single shear bolt is shown in the cable assembly of FIGS. 2A-2B, it will be understood that connectors and other applications may utilize two or more shear bolts of the present description. FIG. 3 is a top view picture of a cable assembly 301 which includes a cable 362 attached to connector 360 using shear bolts of the present description. Four shafts remaining from the shear bolts are visible in the figure with caps 370 inserted into an outer end (end closest to outer surface 366) of the shafts.

The shear bolts may be configured to shear at a torque in a range determined by the intended application of the shear bolts. In some embodiments, the shear bolts are adapted to shear at a torque in a range of 55 to 70 N-m or in a range of 60 to 70 N-m, for example. In some embodiments, a cable assembly including one or more shear bolts is adapted to provide a pull out force of at least 7 kN, or at least 8 kN, or at least 10 kN, for example. In some embodiments, the connector is adapted to receive a cable having a cross-sectional area (in a cross-section perpendicular to the length of the cable) in a range of 150 to 500 mm$^2$, for example. In some embodiments, the shear bolt is adapted to rupture at a distance from the outer surface of the connector in a range of 0.5 to 1.5 mm, for example.

The following is a list of exemplary embodiments of the present description.

Embodiment 1 is a shear bolt comprising:
a head portion; and
a shaft portion extending along an axis from the head portion,
wherein the shaft portion has a threaded outer surface and a stepped bore, the stepped bore having a plurality of regions along the axis and a plurality of steps, each step in the plurality of steps separating adjacent regions in the plurality of regions, an inner diameter of the stepped bore being constant in each region in the plurality of regions and changing discontinuously at each step in the plurality of steps, the inner diameter increasing from a first region in the plurality of regions closest to the head portion to a second region in the plurality of regions farthest from the head portion.

Embodiment 2 is the shear bolt of Embodiment 1, wherein the head portion does not have any holes therethrough.

Embodiment 3 is the shear bolt of Embodiment 1, wherein the stepped bore is filled with a resin or a polymeric material.

Embodiment 4 is the shear bolt of Embodiment 1, wherein the stepped bore is not filled.

Embodiment 5 is the shear bolt of any one of Embodiments 1 to 4, further comprising a contact portion inserted into an end of the stepped bore opposite the head portion.

Embodiment 6 is the shear bolt of Embodiment 5, wherein the contact portion is press fit into the end of the stepped bore.

Embodiment 7 is a cable assembly comprising:
a connector;
a cable inserted into the connector;
a shaft extending through a portion of the connector to the cable, the shaft having a threaded outer surface, a stepped bore extending along an axis of the shaft, and a contact portion inserted into a first end of the stepped bore, the contact portion in direct contact with the cable,
wherein the stepped bore has a plurality of regions along the axis, an inner diameter of the stepped bore being constant in each region and changing discontinuously between adjacent regions, the inner diameter of the stepped bore increasing from a first region in the plurality of regions closest to the outer surface of the connector to a second region in the plurality of regions farthest from outer surface of the connector.

Embodiment 8 is the cable assembly of Embodiment 7, wherein the stepped bore is filled with a resin or polymeric material.

Embodiment 9 is the cable assembly of Embodiment 7 or 8, further comprising a cap covering a second end of the shaft opposite the first end.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A shear bolt comprising:
   a head portion; and
   a shaft portion extending along an axis from the head portion,
   wherein the shaft portion has a threaded outer surface and a stepped bore, the stepped bore having a plurality of regions along the axis and a plurality of steps, each step in the plurality of steps separating adjacent regions in the plurality of regions, an inner diameter of the stepped bore being constant in each region in the plurality of regions and changing discontinuously at each step in the plurality of steps, the inner diameter increasing from a first region in the plurality of regions closest to the head portion to a second region in the plurality of regions farthest from the head portion, and wherein the head portion does not have any holes therethrough.

2. The shear bolt of claim 1, wherein the stepped bore is filled with a resin or a polymeric material.

3. The shear bolt of claim 1, wherein the stepped bore is not filled.

4. The shear bolt of claim 1, further comprising a contact portion inserted into an end of the stepped bore opposite the head portion.

5. The shear bolt of claim 4, wherein the contact portion is press fit into the end of the stepped bore.

6. A cable assembly comprising:
   a connector;
   a cable inserted into the connector;
   a shaft extending through a portion of the connector to the cable, the shaft having a threaded outer surface, a stepped bore extending along an axis of the shaft, and a contact portion inserted into a first end of the stepped bore, the contact portion in direct contact with the cable, wherein the stepped bore has a plurality of regions along the axis, an inner diameter of the stepped bore being constant in each region and changing discontinuously between adjacent regions, the inner diameter of the stepped bore increasing from a first region in the plurality of regions closest to an outer surface of the connector to a second region in the plurality of regions farthest from the outer surface of the connector; and
   a cap covering a second end of the shaft opposite the first end.

7. The cable assembly of claim 6, wherein the stepped bore is filled with a resin or polymeric material.

8. A shear bolt comprising:
   a head portion;
   a shaft portion extending along an axis from the head portion, the shaft portion having a threaded outer surface and a stepped bore, the stepped bore having a plurality of regions along the axis and a plurality of steps, each step in the plurality of steps separating adjacent regions in the plurality of regions, an inner diameter of the stepped bore being constant in each region in the plurality of regions and changing discontinuously at each step in the plurality of steps, the inner diameter increasing from a first region in the plurality of regions closest to the head portion to a second region in the plurality of regions farthest from the head portion; and
   a contact portion inserted into an end of the stepped bore opposite the head portion, the contact portion being press fit into the end of the stepped bore.

* * * * *